US012030512B2

(12) United States Patent
Weiss et al.

(10) Patent No.: US 12,030,512 B2
(45) Date of Patent: Jul. 9, 2024

(54) COLLISION WARNING SYSTEM FOR A MOTOR VEHICLE HAVING AN AUGMENTED REALITY HEAD UP DISPLAY

(71) Applicant: GM Global Technology Operations LLC, Detroit, MI (US)

(72) Inventors: John P. Weiss, Shelby Township, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 196 days.

(21) Appl. No.: 17/714,410

(22) Filed: Apr. 6, 2022

(65) Prior Publication Data

US 2023/0322248 A1 Oct. 12, 2023

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60W 30/0956* (2013.01);
(Continued)

(58) Field of Classification Search
CPC .. B60W 50/14; B60W 30/0956; B60W 40/04; B60W 2554/80; B60W 2050/146;
(Continued)

(56) References Cited

U.S. PATENT DOCUMENTS

| 8,471,691 B2 * | 6/2013 | Zhang .................... B60K 35/00 701/1 |
| 9,057,874 B2 | 6/2015 | Seder et al. |

(Continued)

FOREIGN PATENT DOCUMENTS

DE    102022003463 A1 * 3/2024

OTHER PUBLICATIONS

U.S. Appl. No. 17/813,794, filed Jul. 20, 2022, Kai-Han Chang.
U.S. Appl. No. 17/813,781, filed Jul. 20, 2022, Manoj Sharma.
U.S. Appl. No. 17/714,418, filed Apr. 6, 2022, John P. Weiss.

*Primary Examiner* — Chico A Foxx
(74) *Attorney, Agent, or Firm* — Vivacqua Crane, PLLC

(57) ABSTRACT

A collision warning system notifies an occupant of a vehicle about a predicted collision between the vehicle and an object moving relative to the vehicle. The system includes an object input device, a vehicle input device, and a road detection module for generating a road signal associated with a road geometry that is visible through the windshield and located within a field of view of the occupant. The system further includes an ARHUD for generating multiple images upon the windshield and overlaid onto the road geometry. The system further includes a computer including a processor and a non-transitory computer readable storage medium storing instructions. The processor is programmed to determine a predicted collision between the object and the vehicle at a predicted time. The processor is further programmed to generate an actuation signal for actuating the ARHUD to generate the images upon the windshield and overlaid onto the road geometry.

18 Claims, 4 Drawing Sheets

(51) Int. Cl.
    *B60W 30/095*      (2012.01)
    *B60W 40/04*      (2006.01)
    *B60K 35/10*      (2024.01)
    *B60K 35/23*      (2024.01)
    *B60K 35/28*      (2024.01)
    *B60K 35/29*      (2024.01)
    *B60K 35/60*      (2024.01)

(52) U.S. Cl.
    CPC .............. *B60W 40/04* (2013.01); *B60K 35/10* (2024.01); *B60K 35/23* (2024.01); *B60K 35/28* (2024.01); *B60K 35/29* (2024.01); *B60K 35/60* (2024.01); *B60K 2360/119* (2024.01); *B60K 2360/177* (2024.01); *B60K 2360/178* (2024.01); *B60K 2360/1868* (2024.01); *B60K 2360/188* (2024.01); *B60K 2360/785* (2024.01); *B60W 2050/146* (2013.01); *B60W 2554/80* (2020.02)

(58) Field of Classification Search
    CPC ............ B60K 35/00; B60K 2370/1529; B60K 2370/177; B60K 2370/178; B60K 2370/119; B60K 2370/188; B60K 2370/193; B60K 2370/1868; B60K 2370/785
    See application file for complete search history.

(56) References Cited

U.S. PATENT DOCUMENTS

| | | | |
|---|---|---|---|
| 10,532,697 B2 * | 1/2020 | Rakshit | G06T 19/006 |
| 10,747,314 B1 | 8/2020 | Chang et al. | |
| 10,860,093 B1 | 12/2020 | Chang et al. | |
| 10,880,529 B2 | 12/2020 | Chang et al. | |
| 10,916,144 B2 * | 2/2021 | Kang | G08G 1/167 |
| 10,926,638 B1 | 2/2021 | Chang et al. | |
| 11,024,056 B2 | 6/2021 | Chang et al. | |
| 11,079,593 B2 * | 8/2021 | Green | B60W 30/095 |
| 11,106,044 B2 | 8/2021 | Seder et al. | |
| 11,135,881 B2 | 10/2021 | Hall et al. | |
| 2010/0164702 A1 | 7/2010 | Sasaki et al. | |
| 2011/0082623 A1 * | 4/2011 | Lu | B60W 10/06 701/41 |
| 2012/0236122 A1 * | 9/2012 | Fukawa | H04N 23/743 348/148 |
| 2013/0289844 A1 * | 10/2013 | Park | B60T 7/22 701/70 |
| 2014/0032094 A1 * | 1/2014 | Heinrichs-Bartscher | B60W 50/0097 701/301 |
| 2014/0362195 A1 | 12/2014 | Ng-Thow-Hing et al. | |
| 2015/0206431 A1 * | 7/2015 | Park | G08G 1/0962 701/1 |
| 2016/0003636 A1 * | 1/2016 | Ng-Thow-Hing | G01C 21/365 701/418 |
| 2016/0046232 A1 * | 2/2016 | Guy | B60R 21/0134 340/436 |
| 2016/0059855 A1 | 3/2016 | Rebhan et al. | |
| 2017/0210379 A1 * | 7/2017 | Obata | B60W 30/18163 |
| 2017/0225614 A1 * | 8/2017 | Park | G08G 1/165 |
| 2017/0293837 A1 * | 10/2017 | Cosatto | G06V 20/64 |
| 2019/0061763 A1 * | 2/2019 | Takeda | B60W 10/18 |
| 2019/0225212 A1 * | 7/2019 | Buerkle | B60W 30/0956 |
| 2019/0233034 A1 | 8/2019 | Viele et al. | |
| 2019/0340522 A1 * | 11/2019 | Mori | B60W 30/0956 |
| 2020/0180656 A1 * | 6/2020 | Kim | B60W 30/0956 |
| 2020/0355512 A1 | 11/2020 | Cho | |
| 2021/0166564 A1 * | 6/2021 | Takaki | G08G 1/166 |
| 2021/0287546 A1 * | 9/2021 | Englander | B60W 40/10 |
| 2021/0370780 A1 * | 12/2021 | Cho | B60L 15/2009 |
| 2022/0044032 A1 | 2/2022 | Baltaxe et al. | |
| 2022/0066211 A1 | 3/2022 | Seder et al. | |
| 2022/0262236 A1 * | 8/2022 | Ueno | G02B 27/0093 |
| 2022/0289176 A1 * | 9/2022 | Baek | B60W 50/16 |
| 2022/0309924 A1 * | 9/2022 | Mimura | B60Q 5/006 |
| 2023/0114001 A1 * | 4/2023 | Cai | B60Q 9/00 340/435 |
| 2023/0121366 A1 * | 4/2023 | Sulaiman | B60W 40/04 340/576 |
| 2023/0278552 A1 * | 9/2023 | Park | B60W 30/0953 701/93 |

* cited by examiner

COLLISION WARNING SYSTEM FOR A MOTOR VEHICLE HAVING AN AUGMENTED REALITY HEAD UP DISPLAY

INTRODUCTION

The present disclosure relates to a motor vehicle having a collision warning system for predicting an imminent collision between the motor vehicle and an object, and more particularly to a collision warning system having an Augmented Reality Head Up Display (ARHUD) for generating a notification symbol upon a windshield where a trajectory of the object and a predicted crash site are visible.

A Collision Avoidance System (CAS), also known as a pre-crash system, forward collision warning system, or collision mitigation system, is an Advanced Driver Assistance System (ADAS) that prevents or decreases the severity of a collision. The CAS monitors a vehicle's speed, the speed of the vehicle in front of it, and the distance between the vehicles, so that the CAS can provide a warning to the driver if the vehicles get too close to one another, potentially helping to avoid a collision. Various technologies and sensors that are used include radar, lidar, and cameras to detect an imminent collision. GPS sensors can detect fixed dangers, such as approaching stop signs through a location database. Pedestrian detection can also be a feature of these types of systems. However, existing CAS do not provide visible alerts overlaid directly onto road geometry associated with the collision.

Thus, while existing CAS and processes of motor vehicles may achieve their intended purpose, there is a need for a new and improved Collision Warning System (CWS) and process that address these issues.

SUMMARY

According to several aspects of the present disclosure, a collision warning system is provided for a motor vehicle having a windshield. The system notifies an occupant of the motor vehicle about a predicted collision between the motor vehicle and an object. The object is positioned external to the motor vehicle and moving relative to the motor vehicle. The system includes one or more object input devices for generating an object signal associated with movement of the object relative to the motor vehicle. The system further includes one or more vehicle input devices for generating a vehicle signal associated with movement of the motor vehicle. The system further includes a road detection module for generating a road signal associated with a road geometry, which is visible through the windshield and located within a field of view of the occupant, with the object moving toward the road geometry. The system further includes an Augmented Reality Head Up Display module (ARHUD) for generating multiple images upon the windshield and overlaid onto the road geometry. The system further includes a computer that has one or more processors electrically communicating with the object input device, the vehicle input device, the road detection module, and the ARHUD. The computer further includes a non-transitory computer readable storage medium storing instructions, such that the processor is programmed to receive the object signal from the object input device, the vehicle signal from the vehicle input device, and the road signal from the road detection module. The processor is further programmed to determine the predicted collision between the object and the motor vehicle at a predicted crash site portion of the road geometry at a predicted time based on the object signal, the vehicle signal, and the road signal. The processor is further programmed to generate an actuation signal, in response to the processor determining the predicted collision. The ARHUD is configured to generate the images upon the windshield and overlaid onto the road geometry to notify the occupant of the predicted collision, in response to the ARHUD receiving the actuation signal from the processor.

In one aspect, the processor is further programmed to determine a real-time object trajectory associated with the object based on the object signal. The processor is further programmed to determine a real-time vehicle trajectory associated with the motor vehicle based on the vehicle signal. The processor is further programmed to determine the predicted collision based on the real-time object trajectory, the real-time vehicle trajectory, and/or the road geometry.

In another aspect, the object signal is indicative of a speed of the object, and the vehicle signal is indicative of a speed of the motor vehicle. The processor is programmed to determine the predicted collision, in response to the processor determining that: the real-time object trajectory and the real-time vehicle trajectory intersect one another; and a speed of the object and a speed of the motor vehicle are above a predetermined speed threshold.

In another aspect, the ARHUD is configured to generate the images upon the windshield at a predetermined amount of time before the predicted time of the predicted collision.

In another aspect, the ARHUD is configured to generate the images including a notification symbol, in response to the ARHUD receiving the actuation signal from the processor. The notification symbol is associated with the object and includes an animated graphic, a caution symbol, a vehicle icon, an animal icon, and/or a pedestrian icon.

In another aspect, the notification symbol has a color, a size, and/or a symbol associated with an urgency level of the predicted collision.

In another aspect, the notification symbol has a red color, in response to the processor determining that: the speed of the object is above a predetermined speed threshold; and/or a distance of the motor vehicle from the predicted crash site portion of the road geometry is below a predetermined proximity threshold.

In another aspect, the ARHUD is further configured to display information regarding the notification symbol within a near-field image plane of the windshield.

In another aspect, the ARHUD is further configured to project the notification symbol within a far-field image plane of the windshield.

In another aspect, the system further includes an eye tracker electrically communicating with the processor and generating a user signal associated with a location of an eye of the occupant, such that the ARHUD projects the notification symbol on a portion of the far-field image plane of the windshield where the notification symbol is overlaid onto the real-time object trajectory that is visible to the occupant.

In another aspect, the far-field image plane is overlaid onto the road geometry that extends from a first location that is spaced a minimum distance from the motor vehicle to a second location that is spaced a maximum distance from the motor vehicle, such that the notification symbol on the far-field image plane occludes one or more lanes of traffic.

In another aspect, the object input device includes a radar device, a lidar device, an externally-facing camera, a night-vision camera, an infrared camera, a vehicle brake sensor, a steering angle sensor, an accelerometer, a wheel speed sensor, an ultrasonic device, a GPS network, an inclinometer, a V2X network, a Wi-Fi network, a DSRC network, a cellular network, and/or an Internet network.

According to several aspects of the present disclosure, a computer is provided for a collision warning system of a motor vehicle having a windshield. The system notifies an occupant of the motor vehicle about a predicted collision between the motor vehicle and an object, which is positioned external to the motor vehicle and is moving relative to the motor vehicle. The system further includes an object input device for generating an object signal associated with movement of the object relative to the motor vehicle. The system further includes a vehicle input device for generating a vehicle signal associated with movement of the motor vehicle. The system further includes a road detection module for generating a road signal associated with a road geometry, which is visible through the windshield and located within a field of view of the occupant, with the object moving toward the road geometry. The system further includes an Augmented Reality Head Up Display module (ARHUD) for generating multiple images upon the windshield and overlaying the images onto the road geometry. The computer includes one or more processors electrically communicating with the object input device, the vehicle input device, the road detection module, and the ARHUD. The computer further includes a non-transitory computer readable storage medium storing instructions, such that the processor is programmed to receive the object signal from the object input device, the vehicle signal from the vehicle input device, and the road signal from the road detection module. The processor is further programmed to determine the predicted collision between the object and the motor vehicle at a predicted crash site portion of the road geometry at a predicted time based on the object signal, the vehicle signal, and the road signal. The processor is further programmed to generate an actuation signal, in response to the processor determining the predicted collision. The ARHUD is configured to generate the images upon the windshield and overlay the images onto the road geometry to notify the occupant of the predicted collision, in response to the ARHUD receiving the actuation signal from the processor.

In one aspect, the processor is further programmed to determine a real-time object trajectory associated with the object based on the object signal, a real-time vehicle trajectory associated with the motor vehicle based on the vehicle signal, and the predicted collision based on the real-time object trajectory, the real-time vehicle trajectory, and/or the road geometry.

In another aspect, the object signal is indicative of a speed of the object, and the vehicle signal is indicative of a speed of the motor vehicle. The processor is further programmed to determine the predicted collision, in response to the processor determining that: the real-time object trajectory and the real-time vehicle trajectory intersect one another; and a speed of the object and a speed of the motor vehicle are above a predetermined speed threshold.

In another aspect, the notification symbol has a red color, in response to the processor determining that: the speed of the object is above a predetermined speed threshold; and a distance of the motor vehicle from the predicted crash site portion of the road geometry is below a predetermined proximity threshold.

According to several aspects of the present disclosure, a process of is provided for operating a collision warning system of a motor vehicle having a windshield. The system notifies an occupant of the motor vehicle about a predicted collision between the motor vehicle and an object. The system includes an object input device, a vehicle input device, a road detection module, an Augmented Reality Head Up Display module (ARHUD), and a computer. The computer includes a processor and a non-transitory computer readable storage medium storing instructions. The process includes moving the object toward a road geometry, which is visible through the windshield and located within a field of view of the occupant. The process further includes generating, using the object input device, an object signal associated with movement of the object relative to the motor vehicle. The process further includes generating, using the vehicle input device, a vehicle signal associated with movement of the motor vehicle. The process further includes generating, using the road detection module, a road signal associated with the road geometry. The process further includes generating, using the ARHUD, multiple images upon the windshield and overlaid onto the road geometry. The process further includes receiving, using the processor, the object signal from the object input device, the vehicle signal from the vehicle input device, and the road signal from the road detection module. The process further includes determining, using the processor, the predicted collision between the object and the motor vehicle at a predicted crash site portion of the road geometry at a predicted time based on the object signal, the vehicle signal, and the road signal. The process further includes generating, using the processor, an actuation signal in response to the processor determining the predicted collision. The process further includes generating, using the ARHUD, the images upon the windshield and overlaying the images onto the road geometry to notify the occupant of the predicted collision, in response to the ARHUD receiving the actuation signal from the processor.

In one aspect, the process further includes determining, using the processor, a real-time object trajectory associated with the object based on the object signal. The process further includes determining, using the processor, a real-time vehicle trajectory associated with the motor vehicle based on the vehicle signal. The process further includes determining, using the processor, the predicted collision based on the real-time object trajectory, the real-time vehicle trajectory, and the road geometry.

In another aspect, the process further includes determining, using the processor, the predicted collision in response to the processor determining that: the real-time object trajectory and the real-time vehicle trajectory intersect one another; and a speed of the object and a speed of the motor vehicle are above a predetermined speed threshold. The object signal is indicative of a speed of the object, and the vehicle signal is indicative of a speed of the motor vehicle.

In another aspect, the process further includes determining, using the processor, that the speed of the object is above a predetermined speed threshold. The process further includes determining, using the processor, that a distance of the motor vehicle from the predicted crash site portion of the road geometry is below a predetermined proximity threshold. The process further includes displaying, using the ARHUD, the notification symbol having a red color, in response to the processor determining that the speed of the object is above the predetermined speed threshold and that the distance of the motor vehicle from the predicted crash site portion of the road geometry is below a predetermined proximity threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
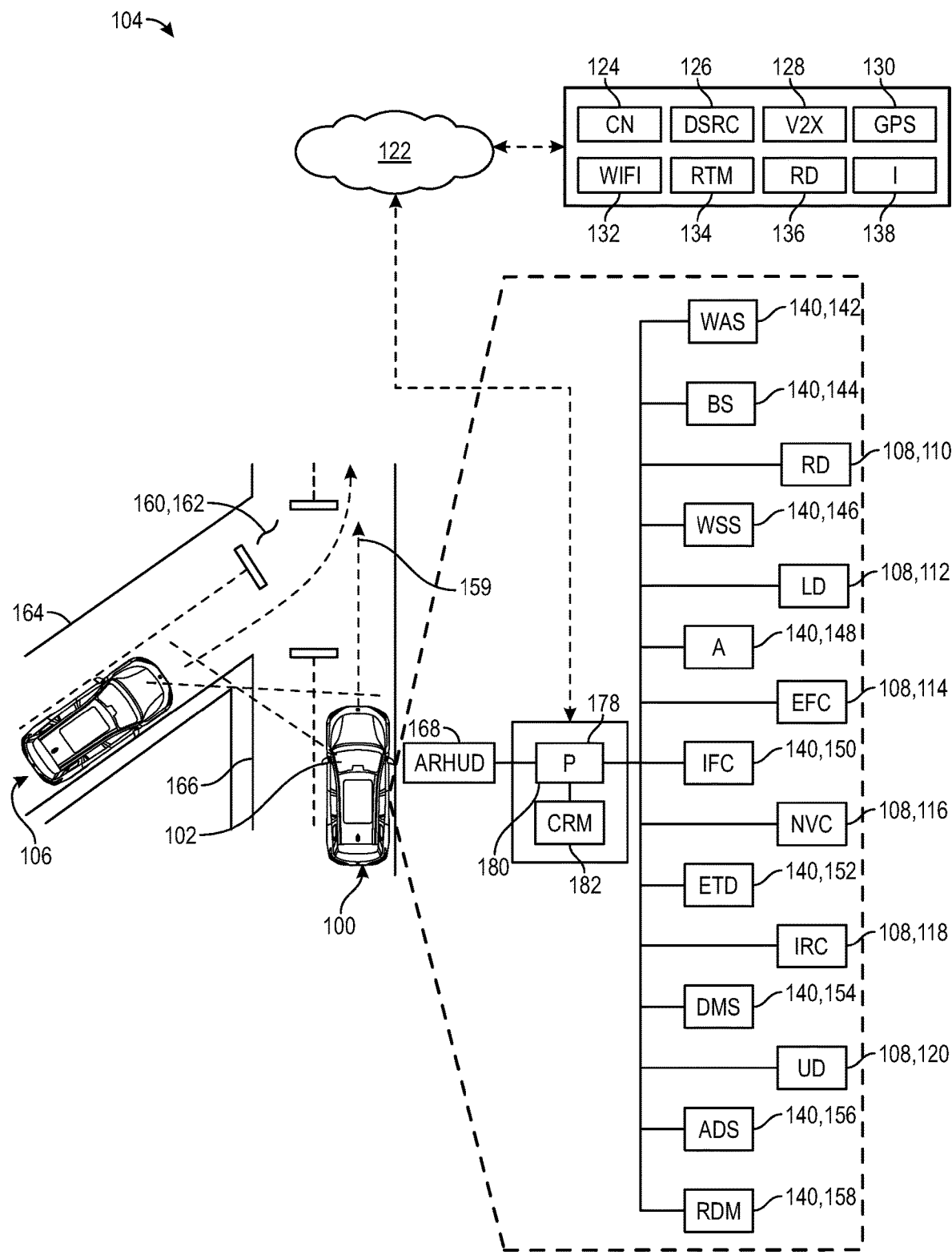
FIG. 1 is a schematic diagram of one example of a collision warning system of a motor vehicle having an Augmented Reality Head Up Display (ARHUD) and a windshield for warning an occupant of the motor vehicle about a predicted collision between the motor vehicle and an object.

Referring to FIG. 1, one example of a motor vehicle 100 includes a windshield 102 and a collision warning system 104 for determining a predicted collision between the motor vehicle 100 and an object 106 at a predicted crash site portion 159 of a road geometry 160 and at a predicted time. As detailed below. the system 104 displays images on the windshield 102 a predetermined amount of time before the predicted time to warn an occupant of the motor vehicle 100 of the predicted collision. Non-limiting examples of the motor vehicle is a land vehicle, such as a sedan, a light duty truck, a heavy duty truck, a sport utility vehicle, a van, or a motor home. The motor vehicle 100 is an autonomous vehicle, a semi-autonomous vehicle, or a non-autonomous (manual) vehicle. Non-limiting examples of the object 106 can include another vehicle, a train, a streetcar, a bicyclist, a motorcyclist, an animal, or a pedestrian. However, it is contemplated that the system can detect other suitable motor vehicles and objects that are moving along trajectories such that the motor vehicle and the object can collide with one another.

The system 104 includes one or more object input devices 108 for generating an object signal associated with movement of the object 106 relative to the motor vehicle 100. The object 106 is positioned external to the motor vehicle 100 and is moving relative to the motor vehicle 100. Non-limiting examples of the object input device 108 can be on-board devices attached to the motor vehicle 100, such as a radar device 110, a lidar device 112, an externally-facing camera 114, a night-vision camera 116, an infrared camera 118, or an ultrasonic device 120. Non-limiting examples of the object input device 108 can wirelessly connect to one or more external data and communication networks 122, such as a cellular network 124, a dedicated short-range communications (DSRC) network 126, a vehicle-to-infrastructure (V2X) network 128, a GPS network 130, a Wi-Fi network 132, a road traffic monitoring network 134, a road database 136, and an Internet network 138. However, it is contemplated that the object input device can include other suitable on-board devices or off-board devices.

In this non-limiting example, the object signal is indicative of a speed and a location of the object, and a direction in which the object is moving. In other examples, the object signal can be indicative of a current distance between the object and the predicted crash site portion 159 of the road geometry 160, a size of the object, a mass of the object, a classification of the object (e.g., another vehicle, a train, a streetcar, a bicyclist, a motorcyclist, an animal, a pedestrian etc.), data on traffic surrounding the object, or other suitable data associated with the object. It is contemplated that the object signal can be indicative of other suitable parameters of the object corresponding with an imminent collision between the object and the motor vehicle.

The system 104 further includes one or more vehicle input devices 140 for generating a vehicle signal associated with movement of the motor vehicle 100. Non-limiting examples of vehicle input devices can include on-board devices, such as a steering wheel angle sensor 142, a brake sensor 144, a wheel speed sensor 146, an accelerometer 148, an internally-facing camera 150 (e.g., an eye tracker device 152), or other input devices that are components of a Driver Monitoring System 154 (DMS), an Automated Driving System 156 (ADS), or other vehicle systems. Non-limiting examples of the vehicle input device 140 can further include off-board devices in the data and communication network 122, such as the cellular network 124, the DSRC network 126, the V2X network 128, the GPS network 130, the Wi-Fi network 132, the road traffic monitoring network 134, the road database 136, and the Internet network 138. However, it is contemplated that the vehicle input device can include other suitable on-board devices or off-board devices.

In this non-limiting example, the vehicle signal is indicative of a speed and a location of the motor vehicle, and a direction in which the motor vehicle is moving. In other examples, the vehicle signal can be indicative of a current distance between the motor vehicle and the predicted crash site portion 159 of the road geometry 160, a size of the motor vehicle, a mass of the motor vehicle, a classification of the motor vehicle, data on traffic surrounding the motor vehicle, or other suitable data associated with the motor vehicle. It is contemplated that the vehicle signal can be indicative of other suitable parameters of the motor vehicle corresponding with an imminent collision between the object and the motor vehicle.

The system 104 further includes a road detection module 158 for generating a road signal associated with the road geometry 160 that is visible through the windshield 102 and located within a field of view of the occupant, with the object 106 moving toward this road geometry 160. In this non-limiting example, the road detection module 158 can include the radar device 110, the lidar device 112, the externally-facing camera 114, the night-vision camera 116, the infrared camera 118, the ultrasonic device 120, the GPS network 130, the V2X network 128, the Wi-Fi network 132, the DSRC network 126, the road traffic monitoring network 134, the road database 136, the cellular network 124, and/or the Internet network 138.

In the non-limiting example shown in FIG. 1, the road signal is indicative of the road geometry 160 in the form of an intersection 162 between first and second roads 164, 166 that are positioned perpendicularly to one another. In other examples, the road signal can be indicative of the road geometry, such as an entrance ramp, an exit ramp, a merging lane, and/or an adjacent lane of traffic. It is contemplated that the road signal can be indicative of other suitable road geometries where the system predicts the object and the motor vehicle may collide with one another.

As described in detail below, the system 104 further includes an Augmented Reality Head Up Display (ARHUD)

168 for generating a plurality of images 170 (FIG. 2) upon the windshield 102 and overlay the images on the road geometry 160 to notify the occupant of the predicted collision between the object 106 (FIG. 1) and the motor vehicle 100. In addition, the eye tracker device 152 generates a user signal associated with a location of an eye of the occupant. As described in detail below, the ARHUD 168 projects a notification symbol 174 (FIGS. 2 and 3) on a portion of a far-field image plane 176 of the windshield 102 where the notification symbol 174 is overlaid onto the predicted crash site portion 159 of the road geometry 160 that is visible to the occupant.

Referring back to FIG. 1, the system 104 further includes a computer 178 having one or more processors 180 electrically communicating with the object input device 108, the vehicle input device 140, the road detection module 158, the ARHUD 168, and the eye tracker device 152. The computer 178 further includes a non-transitory computer readable storage medium 182 (CRM) storing instructions, such that the processor 180 is programmed to receive the object signal from the object input device, the vehicle signal from the vehicle input device 140, the road signal from the road detection module 158, and the user signal from the eye tracker device 152. The user signal includes driver perception data associated with the location of a head of the driver and the orientation or gaze location of the driver's eyes. It is to be appreciated that the driver eye and head positions are at a different location than the object input devices 108 (e.g., cameras), and therefore there may be areas in the environment that the occupant may view that are not captured by the image capturing devices, and vice versa.

The processor 180 is programmed to determine the predicted collision between the object 106 and the motor vehicle 100 at the predicted time based on the object signal, the vehicle signal, the road signal, and the user signal. More specifically, the processor 180 is further programmed to determine a real-time object trajectory of the object toward the road geometry 160 based on the object signal. The processor 180 is further programmed to determine a real-time vehicle trajectory of the motor vehicle 100 toward the road geometry 160 based on the vehicle signal. In this non-limiting example, the processor 180 is further programmed to determine the predicted collision at the predicted time based on the real-time object trajectory, the speed of the object 106, the distance between the object 106 and the predicted crash site portion 159 of the road geometry 160, the real-time vehicle trajectory, the speed of the motor vehicle 100, the distance between the motor vehicle 100 and the predicted crash site portion 159 of the road geometry 160, and/or the road geometry 160. In the example shown in FIG. 1, the real-time object trajectory extends along a first road 164, and the real-time vehicle trajectory extends along a second road 166, with the first and second roads 164, 166 connected to one another at an intersection 162.

In another non-limiting examples, the processor 180 is further programmed to determine the predicted collision based on a braking distance of the object. In this example, the object signal can be further associated with a distance between the object 106 and the predicted crash site portion 159, the mass of the object 106, the size of the object 106, the classification of the object 106, and/or a status of a traffic control signal located at the predicted crash site portion of the intersection 162. Also in this example, the vehicle signal can be further associated with a distance between the motor vehicle 100 and the predicted crash site portion 159, the mass of the motor vehicle 100, the size of the motor vehicle 100, and/or the classification of the motor vehicle 100.

The processor 180 is programmed to generate an actuation signal, in response to the processor 180 determining the predicted collision. The ARHUD 168 is configured to generate the images upon the windshield 102 and overlay the images onto the road geometry 160 (FIG. 2) to notify the occupant of the predicted collision, in response to the ARHUD 168 receiving the actuation signal from the processor 180. In this non-limiting example, the ARHUD 168 is configured to generate the images upon the windshield 102 at a predetermined amount of time before the predicted time of the predicted collision. As but one example, the ARHUD can project the images upon the windshield 102 three to five seconds before the predicted time of collision, in response to the ARHUD 168 receiving the actuation signal from the processor 180. In another example, the ARHUD 168 can project the images on the windshield fewer than three seconds before the predicted time of collision to avoid false alarms when, for example, the processor 180 determines that the braking distance of the motor vehicle 100 is more than the current distance between the motor vehicle 100 and the predicted crash site portion 159. In still another example, the ARHUD 168 can project the images on the windshield more than five seconds before the predicted time of collision to provide more response time for the occupant of the motor vehicle 100 when, for example, the processor 180 determines that the braking distance of the motor vehicle 100 is less than the current distance between the motor vehicle 100 and the predicted crash site portion 159.

The images that are displayed on the windshield 102 may include a notification symbol 174 (FIG. 2), in response to the ARHUD 168 receiving the actuation signal from the processor 180. In one non-limiting example, the notification symbol 174 can include a vehicle icon, an animal icon, a pedestrian icon, an animated graphic, and a caution symbol, in response to the processor 180 determining that the object 106 is an associated one of another vehicle, an animal, a pedestrian, a motorcyclist, and a bicyclist. It is contemplated that the images can include any graphic associated with any object.

Figure 2:
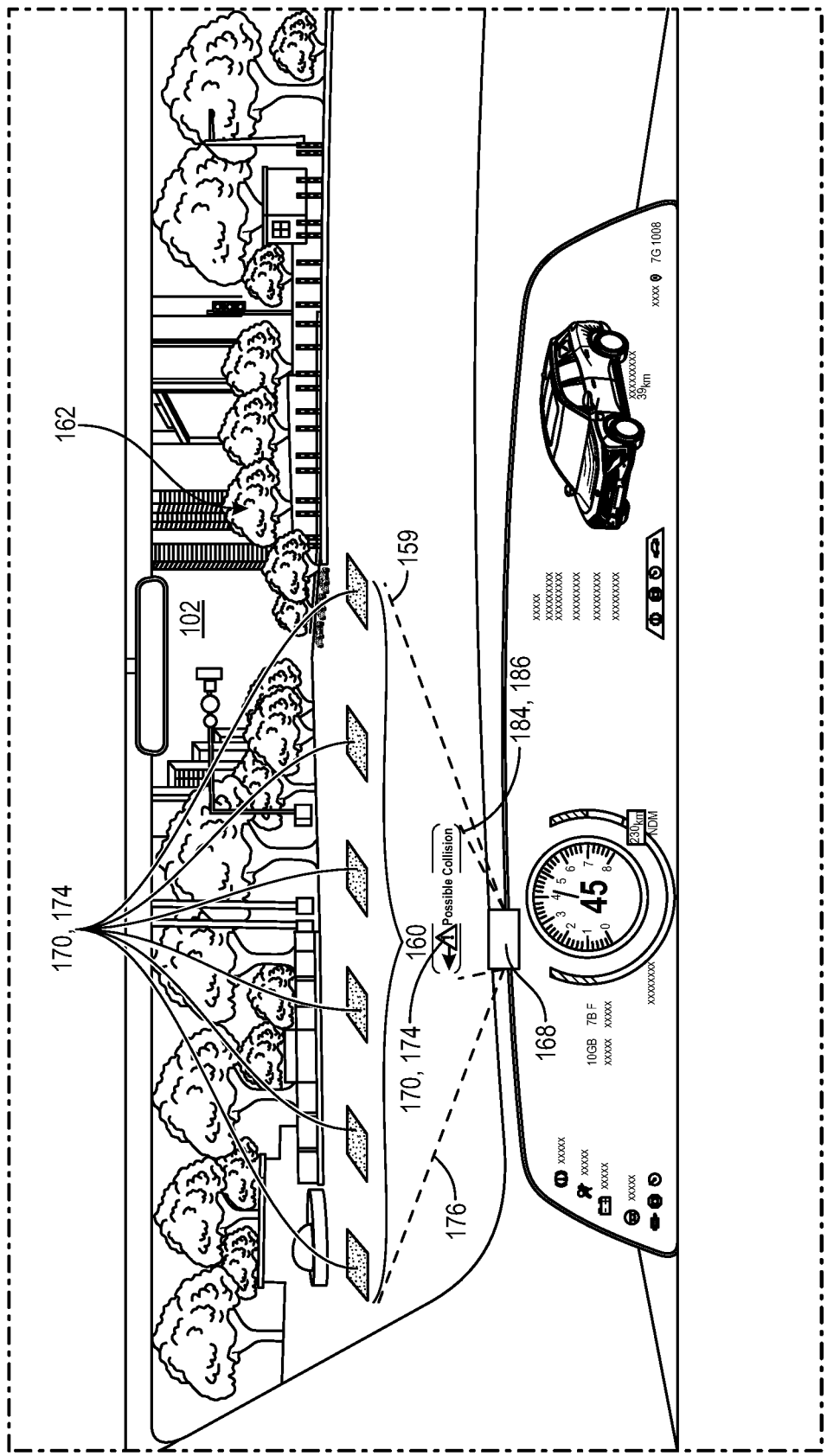
FIG. 2 is an exemplary interior view of the windshield of FIG. 1, where the environment surrounding the motor vehicle is visible through the windshield.

As shown in FIG. 2, the notification symbol 174 is generated upon the windshield 102 of the vehicle 100 and is overlaid at a position upon the windshield 102 where the road geometry 160 or imminent path of the object 106 is visible by the driver. The notification symbol 174 has a color, a size, and/or a symbol associated with an urgency level of the predicted collision. In this example, the notification symbol 174 has a red color, in response to the processor 180 determining that at least one of: the speed of the object is above a predetermined speed threshold; and a distance between the motor vehicle 100 from the predicted crash site portion 159 is below a predetermined proximity threshold.

The ARHUD 168 is further configured to display information regarding the notification symbol 174 (FIG. 2) within a near-field image plane 184 of the windshield 102. In this non-limiting example, the ARHUD 168 is configured to project cluster content information 186 (FIG. 2) upon the windshield 102 within the near-field image plane 184. The cluster content information 186 informs the driver of the motor vehicle 100 of driving conditions such as, but not limited to, vehicle speed, speed limit, gear position, fuel level, current position, and navigational instructions. Also, in this non-limiting example, the cluster content information 186 includes vehicle speed and navigational directions. Some examples of the notification symbol 174 are associated with a warning including the term "Possible Collision"

and/or a description of the object (i.e., the object is another vehicle, another vehicle, a train, a streetcar, a bicyclist, a motorcyclist, an animal, or a pedestrian etc.) and a distance from the motor vehicle 100 to the predicted crash site portion 159.

Figure 3:
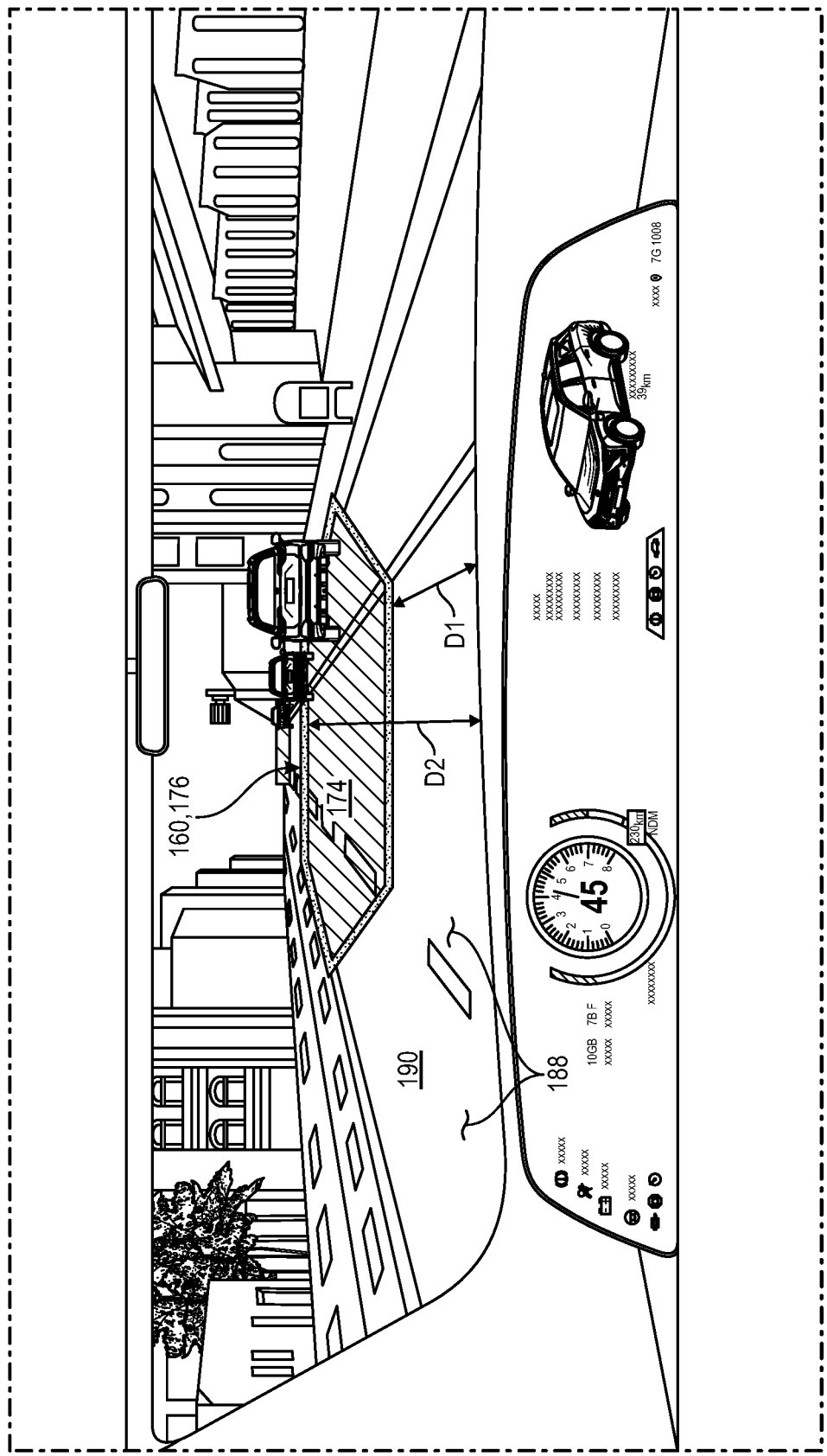
FIG. 3 is an exemplary view through the windshield of FIG. 1, where the ARHUD displays a second image plane representing images appearing a predetermined distance from the motor vehicle and across multiple lanes of traffic.

Referring to FIG. 3, the ARHUD 168 is further configured to project the notification symbol within a far-field image plane 176 of the windshield 102. The far-field image plane 176 is overlaid onto the road geometry 160 extending from a minimum distance D1 from the motor vehicle to a maximum distance D2 from the motor vehicle 100, such that the notification symbol 174 on the far-field image plane 176 occludes one or more lanes 188 of traffic. The processor 180 is further programmed to determine the predicted collision, in response to the processor 180 determining that: the real-time object trajectory and the real-time vehicle trajectory intersect one another; and/or a speed of the object 106 and a speed of the motor vehicle 100 are above a predetermined speed threshold.

The processor 180 instructs the ARHUD 168 to project the notification symbol 174 upon the windshield 102 within the far-field image plane 176, where the notification symbol 174 is overlaid at a position upon the windshield 102 where the real-time object trajectory and associated road geometry would be visible to the eye 172 of the occupant. The far-field image plane 176 contains images overlaid upon the road geometry 160, e.g., the roadway, that is visible through the windshield 102. In the example shown in FIGS. 2 and 3, the far-field image plane 176 only covers a portion of the entire plane of the windshield 102. However, it is contemplated that the far-field image plane may cover the entire plane of the windshield that is not occupied by the near-field image plane 184. Moreover, while FIG. 3 illustrates the far-field image plane spanning across each lane 188 across the roadway 190, other examples of the far-field image plane can span across only a portion of the lanes that are part of the roadway.

Figure 4:
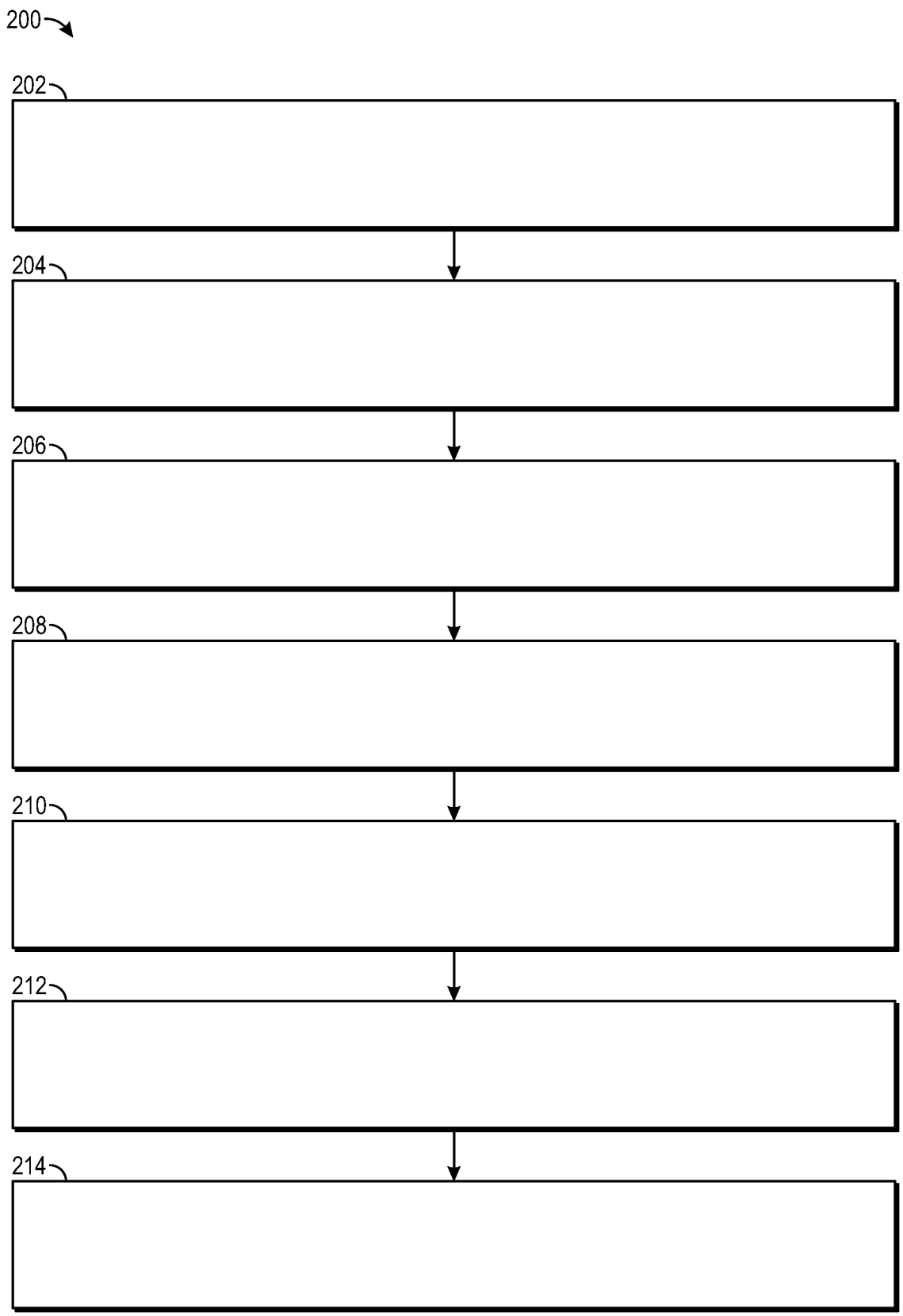
FIG. 4 is a flow chart of one example of a process for operating the collision warning system of FIG. 1.

Referring to FIG. 4, a process 200 for operating the system 104 of FIG. 1 begins at block 202, with the object 106 moving toward the road geometry 160 that is visible through the windshield 102 and located within a field of view of the occupant.

At block 204, the process 200 further includes generating, using the object input device 108, the object signal associated with movement of the object 106 relative to the motor vehicle 100. The process 200 further includes generating, using the vehicle input device 140, the vehicle signal associated with movement of the motor vehicle 100. The process 200 includes generating, using the road detection module 158, the road signal associated with the road geometry 160.

At block 206, the process 200 includes generating, using the ARHUD 168, the images upon the windshield 102 and overlaid onto the road geometry 160.

At block 208, the process 200 includes receiving, using the processor 180, the object signal from the object input device 108, the vehicle signal from the vehicle input device 140, the road signal from the road detection module 158, and the user signal from the eye tracker device 152.

At block 210, the process 200 includes determining, using the processor 180, the predicted collision between the object 106 and the motor vehicle 100 at the predicted time based on the object signal, the vehicle signal, the road signal, and the user signal. More specifically, the process 200 further includes determining, using the processor 180, the real-time object trajectory associated with the object 106 based on the object signal. The process 200 further includes determining, using the processor 180, the real-time vehicle trajectory associated with the motor vehicle 100 based on the vehicle signal. The process 200 further includes determining, using the processor 180, the predicted collision based on the real-time object trajectory, the real-time vehicle trajectory, and/or the road geometry. The process 200 further includes determining, using the processor 180, the predicted collision in response to the processor 180 determining that: the real-time object trajectory and the real-time vehicle trajectory intersect one another; and the speed of the object 106 and the speed of the motor vehicle 100 are above the predetermined speed threshold. The object signal is indicative of the speed of the object 106, and the vehicle signal is indicative of the speed of the motor vehicle 100. The process 200 further includes determining, using the processor 180, that the speed of the object 106 is above the predetermined speed threshold. The process 200 further includes determining, using the processor 180, that the distance of the object 106 from the motor vehicle 100 is below the predetermined proximity threshold.

At block 212, the process 200 includes generating, using the processor 180, the actuation signal in response to the processor 180 determining the predicted collision.

At block 214, the process 200 includes generating, using the ARHUD 168, the images upon the windshield 102 and overlaying the images onto the road geometry 160 to notify the occupant of the predicted collision, in response to the ARHUD 168 receiving the actuation signal from the processor 180. In one non-limiting example, the process 200 includes displaying, using the ARHUD 168, the notification symbol having the red color, in response to the processor 180 determining that the speed of the object 106 is above the predetermined speed threshold and that the distance of the object 106 from the motor vehicle 100 is below a predetermined proximity threshold.

The processors may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the processors may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A collision warning system of a motor vehicle having a windshield, the collision warning system notifying an occupant of the motor vehicle about a predicted collision between the motor vehicle and an object that is positioned external to the motor vehicle and moving relative to the motor vehicle, the collision warning system comprising:
   at least one object input device for generating an object signal associated with movement of the object relative to the motor vehicle, wherein the at least one object sensor is fixed to the vehicle and is selected from a group consisting of a camera and a radar device;

at least one vehicle input device for generating a vehicle signal associated with movement of the motor vehicle;

a road detection module for generating a road signal associated with a road geometry that is visible through the windshield and located within a field of view of the occupant, with the object moving toward a crash site portion of the road geometry;

an Augmented Reality Head Up Display module (ARHUD) for generating a plurality of images upon the windshield and overlaid onto the road geometry; and a computer including at least one processor electrically communicating with the at least one object input device, the at least one vehicle input device, the road detection module, and the ARHUD, where the computer further includes a non-transitory computer readable storage medium storing instructions such that the at least one processor is programmed to:

receive the object signal from the at least one object input device, the vehicle signal from the at least one vehicle input device, and the road signal from the road detection module;

determine a predicted collision between the object and the motor vehicle at the predicted crash site portion of the road geometry at a predicted time based on the object signal, the vehicle signal, and the road signal; and generate an actuation signal in response to the at least one processor determining the predicted collision; and wherein the ARHUD is configured to generate the plurality of images upon the windshield and overlaid onto the road geometry to notify the occupant of the predicted collision in response to the ARHUD receiving the actuation signal from the at least one processor, and wherein the ARHUD is configured to generate the plurality of images upon the windshield at a first predetermined amount of time before the predicted time of the predicted collision when the processor determines that a current braking distance of the motor vehicle is more than a current distance between the motor vehicle and the predicted crash site portion, and the ARHUD is configured to generate the plurality of images upon the windshield at a second predetermined amount of time, that is after the first predetermined amount of time and before the predicted time of the predicted collision, when the processor determines that the current braking distance of the motor vehicle is determined to be more than the current distance between the motor vehicle and the predicted crash site portion, and wherein the plurality of images upon the windshield generated at the second predetermined amount of time is greater than the first predetermined amount of time provided to avoid false alarms.

2. The collision warning system of claim 1 wherein the at least one processor is further programmed to:

determine a real-time object trajectory associated with the object based on the object signal;

determine a real-time vehicle trajectory associated with the motor vehicle based on the vehicle signal; and determine the predicted collision based on at least one of the real-time object trajectory, the real-time vehicle trajectory, and the road geometry.

3. The collision warning system of claim 2 wherein the object signal is indicative of a speed of the object, and the vehicle signal is indicative of a speed of the motor vehicle, and the at least one processor is further programmed to determine the predicted collision in response to the at least one processor determining that:

the real-time object trajectory and the real-time vehicle trajectory intersect one another; and a speed of the object and a speed of the motor vehicle are above a predetermined speed threshold.

4. The collision warning system of claim 1 wherein the ARHUD is configured to generate the plurality of images including a notification symbol in response to the ARHUD receiving the actuation signal from the at least one processor, wherein the notification symbol is associated with the object and comprises at least one of an animated graphic, a caution symbol, a vehicle icon, an animal icon, and a pedestrian icon.

5. The collision warning system of claim 4 wherein the notification symbol has at least one of a color, a size, and a symbol associated with an urgency level of the predicted collision.

6. The collision warning system of claim 5 wherein the notification symbol has a red color in response to the at least one processor determining that at least one of:

the speed of the object is above a predetermined speed threshold; and a distance between the object and the predicted crash site portion of the road geometry is below a predetermined proximity threshold.

7. The collision warning system of claim 5 wherein the ARHUD is further configured to display information regarding the notification symbol within a near-field image plane of the windshield.

8. The collision warning system of claim 5 wherein the ARHUD is further configured to project the notification symbol within a far-field image plane of the windshield.

9. The collision warning system of claim 8 further comprising an eye tracker electrically communicating with the at least one processor and generating a user signal associated with a location of an eye of the occupant, such that the ARHUD projects the notification symbol on a portion of the far-field image plane of the windshield where the notification symbol is overlaid onto the crash site portion of the road geometry that is visible to the occupant.

10. The collision warning system of claim 8 wherein the far-field image plane is overlaid onto the road geometry extending from a minimum distance from the motor vehicle to a maximum distance from the motor vehicle, such that the notification symbol on the far-field image plane occludes at least one lane of traffic.

11. A computer for a collision warning system of a motor vehicle having a windshield, the collision warning system notifying an occupant of the motor vehicle about a predicted collision between the motor vehicle and an object that is positioned external to the motor vehicle and moving relative to the motor vehicle, the collision warning system further including at least one object input device for generating an object signal associated with movement of the object relative to the motor vehicle, the collision warning system further including at least one vehicle input device for generating a vehicle signal associated with movement of the motor vehicle, the collision warning system further including a road detection module for generating a road signal associated with a road geometry that is visible through the windshield and located within a field of view of the occupant, with the object moving toward the road geometry, the collision warning system further including an Augmented Reality Head Up Display module (ARHUD) for generating a plurality of images upon the windshield and overlaid onto the road geometry, the computer comprising:
at least one processor electrically communicating with the at least one object input device, the at least one vehicle input device, the road detection module, and the ARHUD; and a non-transitory computer readable storage medium storing instructions such that the at least one processor is programmed to:
receive the object signal from the at least one object input device, the vehicle signal from the at least one vehicle input device, and the road signal from the road detection module;
determine a predicted collision between the object and the motor vehicle at a predicted crash site portion of the road geometry at a predicted time based on the object signal, the vehicle signal, and the road signal; and
generate an actuation signal in response to the at least one processor determining the predicted collision; and
wherein the ARHUD is configured to generate the plurality of images upon the windshield and overlaid onto the road geometry to notify the occupant of the predicted collision in response to the ARHUD receiving the actuation signal from the at least one processor, and wherein the ARHUD is configured to generate the plurality of images upon the windshield at a first predetermined amount of time before the predicted time of the predicted collision when the processor determines that a current braking distance of the motor vehicle is more than a current distance between the motor vehicle and the predicted crash site portion, and the ARHUD is configured to generate the plurality of images upon the windshield at a second predetermined amount of time, that is after the first predetermined amount of time and before the predicted time of the predicted collision, when the processor determines that the current braking distance of the motor vehicle is determined to be more than the current distance between the motor vehicle and the predicted crash site portion, and wherein the plurality of images upon the windshield generated at the second predetermined amount of time is provided to avoid false alarms.

12. The computer of claim 11 wherein the at least one processor is further programmed to:
determine a real-time object trajectory associated with the object based on the object signal;
determine a real-time vehicle trajectory associated with the motor vehicle based on the vehicle signal; and
determine the predicted collision based on at least one of the real-time object trajectory, the real-time vehicle trajectory, and the road geometry.

13. The computer of claim 12 wherein the object signal is indicative of a speed of the object, and the vehicle signal is indicative of a speed of the motor vehicle, and the at least one processor is further programmed to determine the predicted collision in response to the at least one processor determining that:
the real-time object trajectory and the real-time vehicle trajectory intersect one another; and
a speed of the object and a speed of the motor vehicle are above a predetermined speed threshold.

14. The computer of claim 13 wherein the notification symbol has a red color in response to the at least one processor determining that at least one of:
the speed of the object is above a predetermined speed threshold; and a distance of the motor vehicle from the predicted crash site portion of the road geometry is below a predetermined proximity threshold.

15. A process of operating a collision warning system of a motor vehicle having a windshield, the collision warning system notifying an occupant of the motor vehicle about a predicted collision between the motor vehicle and an object, the collision warning system including at least one object input device, at least one vehicle input device, a road detection module, an Augmented Reality Head Up Display module (ARHUD), and a computer including at least one processor and a non-transitory computer readable storage medium storing instructions, the process comprising:
moving the object toward a road geometry that is visible through the windshield and located within a field of view of the occupant;
generating, using the at least one object input device, an object signal associated with movement of the object relative to the motor vehicle;
generating, using the at least one vehicle input device, a vehicle signal associated with movement of the motor vehicle;
generating, using the road detection module, a road signal associated with the road geometry;
generating, using the ARHUD, a plurality of images upon the windshield and overlaid onto the road geometry;
receiving, using the at least one processor, the object signal from the at least one object input device, the vehicle signal from the at least one vehicle input device, and the road signal from the road detection module;
determining, using the at least one processor, a predicted collision between the object and the motor vehicle at a predicted crash site portion of the road geometry at a predicted time based on the object signal, the vehicle signal, and the road signal;
generating, using the at least one processor, an actuation signal in response to the at least one processor determining the predicted collision; and
generating, using the ARHUD, the plurality of images upon the windshield and overlaid onto the road geometry to notify the occupant of the predicted collision in response to the ARHUD receiving the actuation signal from the at least one processor, wherein the ARHUD generates the plurality of images upon the windshield at a first predetermined amount of time before the predicted time of the predicted collision when a current braking distance of the motor vehicle is more than a current distance between the motor vehicle and the predicted crash site portion, and the ARHUD generates the plurality of images upon the windshield at a second predetermined amount of time, that is after the first predetermined amount of time and before the predicted time of the predicted collision, when the current braking distance of the motor vehicle is determined to be more than the current distance between the motor vehicle and the predicted crash site portion, and wherein the plurality of images upon the windshield generated at the second predetermined amount of time is provided to avoid false alarms.

16. The process of claim 15 further comprising:
determining, using the at least one processor, a real-time object trajectory associated with the object based on the object signal;
determining, using the at least one processor, a real-time vehicle trajectory associated with the motor vehicle based on the vehicle signal; and determining, using the at least one processor, the predicted collision based on at least one of the real-time object trajectory, the real-time vehicle trajectory, and the road geometry.

17. The process of claim 16 further comprising:
determining, using the at least one processor, the predicted collision in response to the at least one processor determining that:
   the real-time object trajectory and the real-time vehicle trajectory intersect one another; and
   a speed of the object and a speed of the motor vehicle are above a predetermined speed threshold;
wherein the object signal is indicative of a speed of the object, and the vehicle signal is indicative of a speed of the motor vehicle.

18. The process of claim 17 further comprising:
determining, using the at least one processor, that the speed of the object is above a predetermined speed threshold;
determining, using the at least one processor, that a distance of the motor vehicle from the predicted crash site portion of the road geometry is below a predetermined proximity threshold; and
displaying, using the ARHUD, the notification symbol having a red color in response to the at least one processor determining that the speed of the object is above the predetermined speed threshold and that the distance of the object from the motor vehicle is below a predetermined proximity threshold.

\* \* \* \* \*